US012412265B2

(12) United States Patent
Doctor

(10) Patent No.: US 12,412,265 B2
(45) Date of Patent: Sep. 9, 2025

(54) MEDICAL DEVICE TROUBLESHOOTING USING COMPUTATIONAL MODELS

(71) Applicant: Fresenius Medical Care Holdings, Inc., Waltham, MA (US)

(72) Inventor: Akbar Abbas Doctor, Concord, CA (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 696 days.

(21) Appl. No.: 17/584,795

(22) Filed: Jan. 26, 2022

(65) Prior Publication Data

US 2022/0245799 A1 Aug. 4, 2022

Related U.S. Application Data

(60) Provisional application No. 63/143,055, filed on Jan. 29, 2021.

(51) Int. Cl.
*G06T 7/00* (2017.01)
*G06V 30/10* (2022.01)

(52) U.S. Cl.
CPC ............ *G06T 7/0012* (2013.01); *G06V 30/10* (2022.01); *G06T 2207/20081* (2013.01)

(58) Field of Classification Search
CPC ........ G06T 7/0012; G06T 2207/20081; G06V 30/10
See application file for complete search history.

(56) References Cited

U.S. PATENT DOCUMENTS

| 2004/0225381 | A1* | 11/2004 | Ritz et al. | G05B 11/01 |
| 2011/0158545 | A1* | 6/2011 | Ohk et al. | G06K 9/68 |
| | | | | 382/218 |
| 2018/0012080 | A1 | 1/2018 | Glaser et al. | |
| 2020/0373003 | A1* | 11/2020 | Lyman et al. | G16H 30/40 |
| 2021/0012868 | A1* | 1/2021 | Wolf et al. | G16H 15/00 |

FOREIGN PATENT DOCUMENTS

| CN | 109002021 A | 12/2018 | |
| EP | 2569930 B1 * | 1/2023 | G06V 30/15 |
| IT | TO960676 A1 * | 2/1998 | |
| JP | WO2020017814 A1 * | 1/2020 | G06T 7/11 |

OTHER PUBLICATIONS

International Search Report and Written Opinion dated Apr. 19, 2022 for International Application No. PCT/US2022/013817.

\* cited by examiner

*Primary Examiner* — Vu Le
*Assistant Examiner* — Matthew James Bodnark
(74) *Attorney, Agent, or Firm* — Leydig, Voit & Mayer, Ltd.

(57) ABSTRACT

Systems and methods for device troubleshooting processes based on computational models are described. In one example, an apparatus may include at least one processor and a memory coupled to the at least one processor. The memory may include instructions that, when executed by the at least one processor, may cause the at least one processor to determine abnormal event information associated with an abnormal event active on the device, and determine, via a computational model: a diagnosis of a device problem based on the abnormal event information, and at least one resolution to resolve the device problem. Other embodiments are described.

16 Claims, 8 Drawing Sheets

MEDICAL DEVICE TROUBLESHOOTING USING COMPUTATIONAL MODELS

CROSS-REFERENCE TO RELATED APPLICATIONS

This application claims the benefit to U.S. Provisional Application No. 63/143,055, filed Jan. 29, 2021, the entire contents of which are incorporated herein by reference in their entirety.

FIELD

The disclosure generally relates to processes for diagnosing and resolving abnormal events associated with a device, and, more particularly, to techniques for training and using computational models for troubleshooting a device, such as a medical device.

BACKGROUND

Complex machines and devices require rigorous testing and quality control to meet consumer expectations, operating standards, and/or regulatory compliance. Medical devices in particular must go through demanding design verification and testing before they are allowed to be marketed to patients. For example, a Design Quality Assurance (DQA) team may lead efforts for medical device design verification. During a new product development, DQA teams may drive the verification efforts which in turn enables manufacturers, in the United States, to file a 510(k) Premarket Notification for the medical device with the Food and Drug Administration (FDA). Approval of the 510(k) enables manufacturers to sell their product in the U.S. market. Design verification and related testing is an important aspect for 510(k) filing. Future design changes of existing products also need to go through a DQA team and, if the changes to the design are significant, a new 510(k) must filed with the FDA for approval of the modified product. In addition to regulatory approval during design and manufacturing, medical devices also require continuous testing and troubleshooting over the lifespan of the device during use treating or diagnosing patients.

Conventional troubleshooting techniques for complex devices, such as medical devices, generally involves a manual process performed by a specialized technician using a manual/guide to perform diagnostics and troubleshooting device issues. Accordingly, such techniques are typically inefficient, error-prone, and costly, particularly for issues that are not directly described in the device manual/guide. In addition, the diagnostic process may be highly dependent on the particular knowledge and experience of the technician. As a result, the efficiency and success of issue diagnostics and resolution is uneven for manufacturers and customers because they are vulnerable to the particular technician performing the troubleshooting procedure.

It is with respect to these and other considerations that the present improvements may be useful.

SUMMARY

This Summary is provided to introduce a selection of concepts in a simplified form that are further described below in the Detailed Description. This Summary is not intended to necessarily identify key features or essential features of the claimed subject matter, nor is it intended as an aid in determining the scope of the claimed subject matter.

In one embodiment, an apparatus may include at least one processor and a memory coupled to the at least one processor. The memory may include instructions that, when executed by the at least one processor, may cause the at least one processor to determine abnormal event information associated with an abnormal event active on the device, and determine, via a computational model: a diagnosis of a device problem based on the abnormal event information, and at least one resolution to resolve the device problem.

In some embodiments of the apparatus, the instructions, when executed by the at least one processor, may cause the at least one processor to train the computational model to determine at least one diagnosis based on historical abnormal event information and historical abnormal event resolution information.

In various embodiments of the apparatus, the abnormal event information may be determined based on an image associated with the device problem. In exemplary embodiments of the apparatus, the instructions, when executed by the at least one processor, may cause the at least one processor to process the image via an exclusive OR (XOR) process to determine the diagnosis. In some embodiments of the apparatus, the instructions, when executed by the at least one processor, may cause the at least one processor to determine the at least one resolution based on historical resolutions associated with a matching image determined via the XOR process. In various embodiments of the apparatus, the instructions, when executed by the at least one processor, may cause the at least one processor to process the image via an optical character recognition (OCR) process to determine the diagnosis. In some embodiments of the apparatus, the instructions, when executed by the at least one processor, may cause the at least one processor to determine the at least one resolution based on historical resolutions associated with device problem text determined during the OCR process.

In various embodiments of the apparatus, the computational model may be or may include at least one of a machine learning (ML) model, and artificial intelligence (AI) model, or an expert system. In some embodiments of the apparatus, the device may be a dialysis machine. In various embodiments of the apparatus, the computational model may be trained to extrapolate at least one diagnosis for undefined abnormal event information.

In one embodiment, a computer-implemented method may include, via at least one processor of a computing device determining abnormal event information associated with an abnormal event active on the device, providing the abnormal event information as input to a computational model trained to diagnose device problems for the device; and determining, via the computational model: a diagnosis of a device problem based on the abnormal event information, and at least one resolution to resolve the device problem.

In some embodiments of the method, the method may include training the computational model to determine at least one diagnosis based on historical abnormal event information and historical abnormal event resolution information.

In various embodiments of the method, the abnormal event information may be determined based on an image associated with the device problem. In exemplary embodiments of the method, the method may include processing the image via an exclusive OR (XOR) process to determine the diagnosis. In some embodiments of the method, the method may include determining the at least one resolution based on historical resolutions associated with a matching image determined via the XOR process. In various embodiments of the method, the method may include processing the image via an optical character recognition (OCR) process to determine the diagnosis. In some embodiments of the method, the method may include determining the at least one resolution based on historical resolutions associated with device problem text determined during the OCR process.

In various embodiments of the method, the computational model may be or may include at least one of a machine learning (ML) model, and artificial intelligence (AI) model, or an expert system. In some embodiments of the method, the device may be a dialysis machine. In various embodiments of the method, the computational model may be trained to extrapolate at least one diagnosis for undefined abnormal event information.

BRIEF DESCRIPTION OF THE DRAWINGS

By way of example, specific embodiments of the disclosed machine will now be described, with reference to the accompanying drawings, in which.

DETAILED DESCRIPTION

Figure 1:
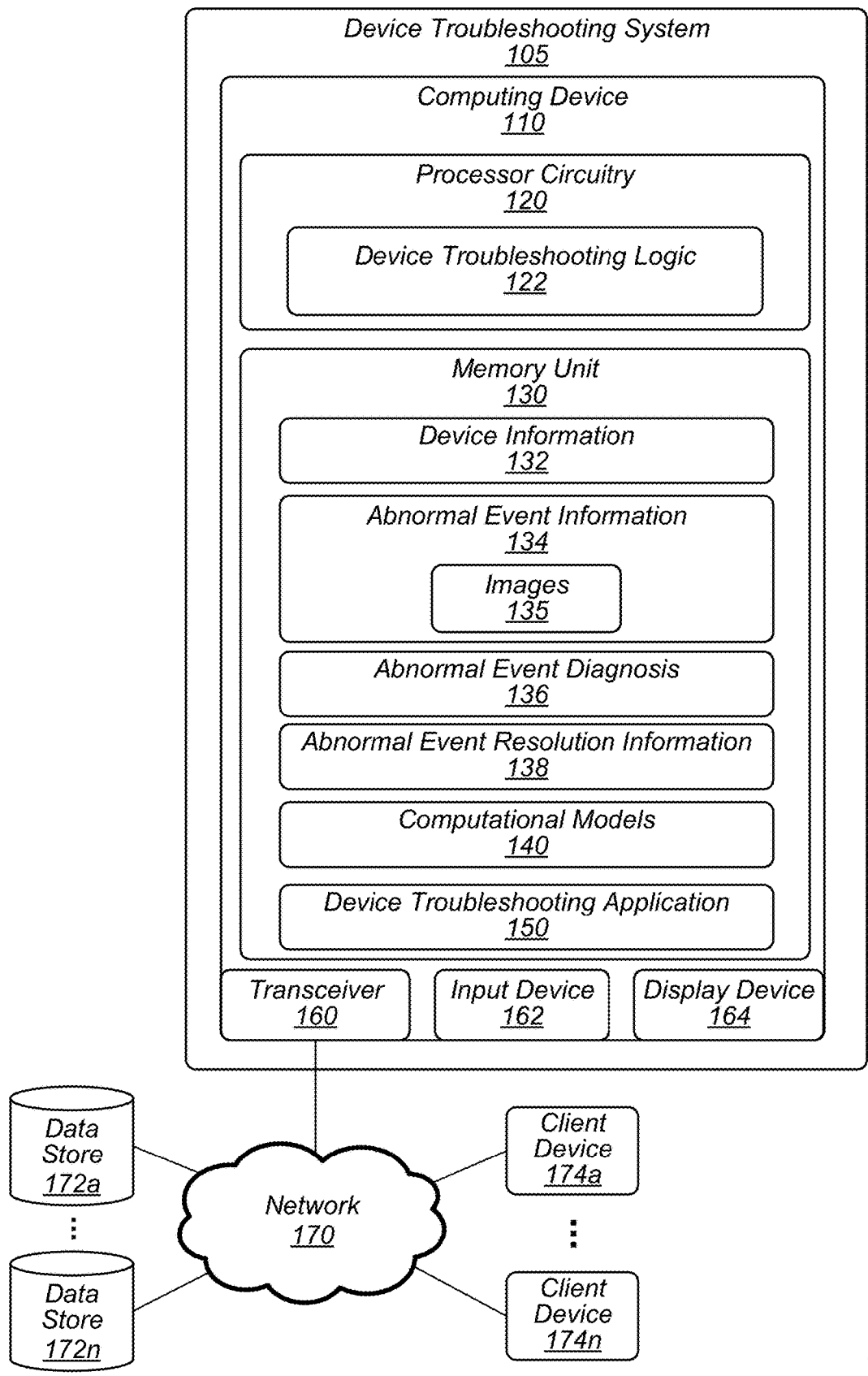
FIG. 1 illustrates a first exemplary operating environment in accordance with the present disclosure.

The present embodiments will now be described more fully hereinafter with reference to the accompanying drawings, in which several exemplary embodiments are shown. The subject matter of the present disclosure, however, may be embodied in many different forms and should not be construed as limited to the embodiments set forth herein. Rather, these embodiments are provided so that this disclosure will be thorough and complete, and willfully convey the scope of the subject matter to those skilled in the art. In the drawings, like numbers refer to like elements throughout.

The described technology is generally directed to processes, systems, and methods for computational model based automated troubleshooting of devices. In general, troubleshooting involves one or more of the following steps: determining that an abnormal event has occurred on the device, diagnosing the abnormal event, generating one or more solutions to address the abnormal event, and resolving the abnormal event to bring the device back to normal operation. An abnormal event may include any non-standard operation of a device (a "device problem") that needs to be fixed or otherwise addressed for proper (or "normal") operation of the device, including an alarm, a warning, an error, unexpected or erroneous operating parameters, and/or the like. The abnormal event may be the result of a system malfunction, hardware malfunction, software error, operator error, configuration error, failed components, and/or the like.

In some embodiments, the devices may include complex devices such as medical devices. In one non-limiting example, a device may include a dialysis machine or system, such as a hemodialysis (HD) machine. Although dialysis machines and systems may be used as example devices, embodiments are not so limited, as any type of device capable of undergoing a troubleshooting process according to some embodiments is contemplated in the present disclosure.

Various embodiments may include a troubleshooting process operating using computational models. In some embodiments, the computational models may be or may include one or more artificial intelligence (AI) models, machine learning (ML) models, deep learning (DL) models, a neural network (NN) (such as an artificial NN (ANN), a convolutional NN (CNN), a recurrent NN (RNN), and/or the like), an expert system, an inference engine, a knowledge base, variations thereof, combinations thereof, and/or the like.

The troubleshooting process may include a training process for training a computational model to diagnose abnormal events associated with a particular device. The troubleshooting process may determine abnormal event information associated with the abnormal event. In some embodiments, the abnormal event information may include text, images, parameter values, operational values, and/or the like. The computational model may be trained to diagnose the abnormal event based on historical abnormal event information, including, for example, device history records (DHRs). For example, the abnormal event information may include alarm message text. The computational model may be trained to diagnose the device error based on the alarm message text. In another example, the abnormal event information may be a set of operating or parameter values. The computational model may be trained to diagnose the device error based on the particular set of operating or parameter values.

In various embodiments, the troubleshooting process may operate to determine abnormal event information from one or more images. For example, an image of a display screen presenting an alarm or other message may be captured, for example by a camera device or by saving an image file. The image may be processed using one or more image processing techniques to determine abnormal event information. Non-limiting examples of image processing techniques may include optical character recognition (OCR) and/or exclusive OR (XOR) image comparison.

High recognition rates (e.g., greater than 95%) may be achieved for supervised learning of an AI troubleshooting model. Supervised learning would require providing the AI troubleshooting model with known troubleshooting solutions and then expect it to provide useful outputs to known abnormal events. However, the design, development, and operation of complex devices, particularly, medical devices, involves unknown and erratic outcomes. In addition, one problem may have numerous symptoms and/or multiple potential solutions. Accordingly, embodiments may include unsupervised training or learning of computational models. This enables a computational model according to some embodiments to learn incrementally disjunctive concepts from noisy and overlapping examples.

In one embodiment, for example, a computational model may handle complex and/or overlapping knowledge by reproducing all the available solutions to the operator and letting them select a solution. Once a solution works, the computational model may then specialize its knowledge base and narrow down the available options for a particular problem in the future. This generalization and specialization cycle may occur continuously for the computational model until it has a one-to-one mapping of problems and solutions. In various embodiments, the one-to-one mapping of problems and solutions may be continually updated, for example, if improved solutions are determined.

Quality is ingrained in the design of a good product. Most manufacturers start looking into the quality of their product during the design phase. This same quality may be implemented during testing, production, and finally to the release of the product. During production, quality is may be implemented at the production facility where all the raw materials and sub-assemblies are received from the vendors. Incoming inspection process may flush out any discrepancies in the incoming parts, which eventually become part of the end product. Once the parts reach the production floor, the sub-assemblies may be inspected/tested at every feasible point on the line to ensure the integrity of the end product. Finally, when the product is fully built, it may be tested as part of end-of-line testing. This final testing phase ensures the functional aspect of the product in the field. After passing this particular testing, a product may be deemed capable for release. Various testing on the production floor may include: incoming inspection (first article inspection (FAI), acceptable quality limit (AQL) Sampling, and/or the like), sub-assembly testing, functional testing, end-of-line testing.

Accordingly, for modern manufacturing processes, quality is part of the entire production process which is manifested as testing at various levels in production. Quality is of prime importance for any company to avoid loss of business, liability, warranty costs, and/or other undesirable outcomes. The investment in quality reaps immense benefits when it comes to the adoption and continued popularity of a product. However, for a medical device, quality has additional importance because device issues in the field may affect patient health. Accordingly, medical device quality may directly translate into human lives, health, and wellbeing. As a result, medical device manufacturers invest more into testing to ensure quality product output.

For example, a Design Quality Assurance (DQA) team may lead efforts for medical device design verification. During a new product development, DQA teams may drive the verification efforts which in turn enables manufacturers, in the United States, to file a 510(k) Premarket Notification for the medical device with the Food and Drug Administration (FDA). Approval of the 510(k) enables manufacturers to sell their product in the U.S. market. Design verification and related testing is an important aspect for 510(k) filing. Future design changes of existing products also need to go through a DQA team and, if the changes to the design are significant, a new 510(k) must filed with the FDA for approval of the modified product. In addition to regulatory approval during design and manufacturing, medical devices also require continuous testing and troubleshooting over the lifespan of the device during use treating or diagnosing patients.

In general, after a design has been released to manufacturing, research and development (R&D) may release test specifications that need to be met during production of the device. A manufacturing engineering team may take the test specifications from R&D and devise a test strategy for the production floor. The test strategy may include various sub-assembly level testing, inspections, and quality assurances all the way to end-of-line testing.

As a lot of testing is performed on the production floor, fallouts due to quality issues may occur during production. Industries deal with fallouts in a variety of ways. For sub-assembly level fallouts, some industries would discard the part while some may implement a rework. During end-of-line testing, many manufacturers would implement a rework and re-test process as it is not economical to discard and scrap an entire product if it fails testing at this stage. Suing conventional systems, automation of testing is not possible. Accordingly, troubleshooting and rework is typically driven by manual labor. For example, technicians or operators in the troubleshooting area may follow a troubleshooting manual/guide and perform diagnostics. These diagnostics can sometimes be very structured and process specific, and are typically dependent on the particular knowledge and/or experience of operators.

However, for a complex machine with numerous sensors, actuators, and/or other systems (e.g., fluid pumps, regulators, valves, and/or the like) inside, a troubleshooting guide may run from a couple hundred to thousands of pages.

For example, dialysis is a complex process performed on renal disease. In dialysis there are many elements involved like fistula, bloodlines, dialyzer and the dialysis machine, which is a very important and perhaps the most complex element of the dialysis process. For instance, a HD machine may perform multiple critical functions, including, for example, the pumping of blood out of the patient, injecting heparin into the blood to avoid clotting, maintaining blood temperature while the blood is out of the patient and flowing through the external (extracorporeal) blood lines and the dialyzer, and/or the like. Along with controlling blood flow, the dialyzer also regulates the flow of the dialysate fluid through the dialyzer, for example, via managing filtration (or ultrafiltration) volume, filtration rates, and/or the like. In some dialyzers, the dialysate is mixed in real time from an acid and bicarbonate solution and its flow properties and temperature may also be maintained by the dialysis machine. Accordingly, dialyzers, such as HD machines, consists of various actuators, sensors, and other elements making it a complex machine to troubleshoot.

Searching through such a huge troubleshooting guide and getting acquainted with the process takes time and hands-on experience. For such a complex process, an operator may take a couple of months to a year to claim expertise. This process of gaining expertise requires a huge investment in time and cost, which is lost whenever an operator leaves the organization.

Therefore, the efficiency and success of such troubleshooting operations are highly dependent on available skilled labor. As a result, conventional troubleshooting operations, particularly in critical manufacturing phases, rely heavily on error-prone manual trial-and-error process and are vulnerable to a lack of knowledgeable technicians to perform the necessary diagnosis and solution steps.

Accordingly, in some embodiments, a computational model may be trained on actual abnormal event information for a device and associated solutions used to diagnose and/or solve the abnormal event. For example, a computational model may be trained on known historical abnormal events (e.g., device operating errors, alarms, and/or the like). A subsequent known or unknown abnormal event for a device may be presented as input to the trained computational model and the trained computational model may generate one or more solutions (or tests to determine further information) as output.

Troubleshooting systems and processes according to some embodiments may provide multiple technological advantages and technical features over conventional systems. One non-limiting example of a technological advantage may include training a computational model using device-specific abnormal event information to provide computer-based troubleshooting processes. As a result, troubleshooting processes may provide efficient and accurate diagnostic and/or solution information that is independent from operator knowledge, manual step-by-step diagnostic processes performed by a technician, and/or the like. Another example of a technological advantage may include generating a dynamic computational model, such as an expert system, capable of extrapolating new solutions to known and/or unknown abnormal events. A further example of a technological advantage may include diagnosing an abnormal event via an image associated with the abnormal event, such as an image of an alarm or warning message presented on a display of a device. Another technological advantage may include using troubleshooting processes configured to comply with quality control guidelines during troubleshooting, such as 21 Code of Federal Regulation Part 11, cGMP, and/or other guidelines Embodiments are not limited in this context.

Processes, techniques, methods, systems, and/or the like described in the present disclosure may be integrated into various practical applications. For example, the troubleshooting process may be integrated into the practical application of training a computational model using historical abnormal event information and resolution information so that future abnormal events may be diagnosed via a computer-based troubleshooting process operating according to some embodiments. In another example, the troubleshooting process may be integrated into the practical application of diagnosing an abnormal event of a device, including a medical device, such as a HD machine or system. In a further example, the troubleshooting process may be integrated into the practical application of validating, qualifying, testing, or otherwise examining a device, components thereof, systems thereof, hardware/software systems thereof, and/or the like during the manufacturing and/or validation phases. Embodiments are not limited in this context.

Additional technological advantages and integrations of embodiments into practical applications are described in and would be known to those of skill in the art in view of the present disclosure.

FIG. 1 illustrates an example of an operating environment 100 that may be representative of some embodiments. As shown in FIG. 1, operating environment 100 may include a device troubleshooting system 105. In various embodiments, device troubleshooting system 105 may include a computing device 110 communicatively coupled to network 170 via a transceiver 160. In some embodiments, computing device 110 may be a server computer or other type of computing device.

Computing device 110 may be configured to manage, among other things, operational aspects of a troubleshooting process according to some embodiments. Although only one computing device 110 is depicted in FIG. 1, embodiments are not so limited. In various embodiments, the functions, operations, configurations, data storage functions, applications, logic, and/or the like described with respect to computing device 110 may be performed by and/or stored in one or more other computing devices (not shown), for example, coupled to computing device 110 via network 170 (for instance, one or more of client devices 174a-n). A single computing device 110 is depicted for illustrative purposes only to simplify the figure. Embodiments are not limited in this context.

Computing device 110 may include a processor circuitry 120 that may include and/or may access various logics for performing processes according to some embodiments. For instance, processor circuitry 120 may include and/or may access a device troubleshooting logic 122. Processing circuitry 120, device troubleshooting logic 122, and/or portions thereof may be implemented in hardware, software, or a combination thereof. As used in this application, the terms "logic," "component," "layer," "system," "circuitry," "decoder," "encoder," "control loop," and/or "module" are intended to refer to a computer-related entity, either hardware, a combination of hardware and software, software, or software in execution, examples of which are provided by the exemplary computing architecture 700. For example, a logic, circuitry, or a module may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, a control loop, a computational model or application, an AI model or application, an ML model or application, a pro-portional-integral-derivative (PID) controller, variations thereof, combinations of any of the foregoing, and/or the like.

Although device troubleshooting logic 122 is depicted in FIG. 1 as being within processor circuitry 120, embodiments are not so limited. For example, device troubleshooting logic 122 and/or any component thereof may be located within an accelerator, a processor core, an interface, an individual processor die, implemented entirely as a software application (for instance, a device troubleshooting application 150) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store various types of information and/or applications for a troubleshooting process according to some embodiments. For example, memory unit 130 may store device information 132, abnormal event information 134, abnormal event diagnosis 136, abnormal event resolution information 138, computational models 140, and/or a device troubleshooting application 150. In some embodiments, some or all of device information 132, abnormal event information 134, abnormal event diagnosis 136, abnormal event resolution information 138, computational models 140, and/or a device troubleshooting application 150 may be stored in one or more data stores 172a-n accessible to computing device 110 via network 170.

In various embodiments, device information 132 may include information associated with a particular device, class of devices, device version, and/or the like. For example, device information may include model information, serial number information, operating parameters, subsystem information (for instance, sensors, actuators, pumps, and/or the like), operating tolerances, and/or any other information associated with a device that may be used during a troubleshooting process. Device information 132 may be determined automatically via device troubleshooting application 150 (for instance, via data stored on device, manufacturer systems, and/or the like) and/or entered manually via an operator.

In some embodiments, abnormal event information 134 may include information associated with an abnormal event of a device. In general, abnormal event information 134 may be used by device troubleshooting application 150 to determine an abnormal event diagnosis (or diagnosis) 136 according to some embodiments. In various embodiments, abnormal event information 134 may include operating parameters, alarms, warnings, device settings, and/or the like. In general, abnormal event information may include information associated with symptoms or indicators of a device problem. For example, a low fluid flow alarm abnormal event information may indicate a failed pump, stuck or failed valve, deficient fluid levels, or other device problems. In another example, abnormal event information of the low fluid flow alarm in combination with a valve alarm for a specific valve and no pump alarms, may indicate that a diagnosis of a failed valve causing the fluid flow alarm. In a further example, abnormal event information 134 may include a low pump voltage indicator that may be used to diagnose a failed pump abnormal event. In some embodiments, abnormal device information 134 may be or may include DHRs.

In exemplary embodiments, diagnosis 136 may include an abnormal event diagnosis specifying one or more particular abnormal events (or device problems). For example, a diagnosis may include a specific abnormal event determined by device troubleshooting application 150, such as a calibration error, pump failure, operator error, and/or the like. In general, a diagnosis may be or may indicate one or more potential sources of abnormal device functionality. For instance, a low fluid pressure device problem may be detected. A diagnosis may indicate that the low fluid pressure may be due to deficient fluid levels (which, in turn, may be diagnosed as being due to a leak, etc.) and/or a failed fluid pump.

In various embodiments, abnormal event information 134 may include images 135 that may be used to generate abnormal event information 134 and/or a diagnosis 136. Images 135 may include a digital or other electronic file that includes an image and/or video associated with device, including a portion of device, an image of information presented on a display screen (e.g., an alarm, a warning, informational text, graphical user interface (GUI) objects, and/or the like). The images may be stored as image files such as *.jpg, *.png, *.bmp, *.tif, and/or the like. In some embodiments, the images may be or may include video files such as *.mp3, *.mp4, *.avi, and/or the like. In some embodiments, images may be captured via an operator and/or a computing device (such as computing device 110) using any capable device, such as a smartphone, tablet computing device, laptop computing device, personal computer (PC), camera, video camera, screen capture application, and/or the like. In other embodiments, images 135 may be captured via generating an image file of displayed GUI objects (i.e., a screen capture) without the use of a camera (e.g., computing device 110 generates an image file of GUI objects displayed on display device). In various embodiments, device troubleshooting application 150 may determine when an abnormal event has occurred and may automatically generate an image 135 responsive to detection of the abnormal event. For instance, if an HD device enters an error state, device troubleshooting application 150 may receive an abnormal event signal indicating that HD device is in an error state and may automatically capture an image of the error state presented on a display device associated with the HD device (e.g., via a camera or a screen capture process).

Images 135 may include training images and/or monitoring images. Training images may be used to train a computational model 140 during a training process of the troubleshooting process. Training images may be simulated or real (e.g., monitoring images from real-world devices). Monitoring images may be used to determine, diagnose, and/or resolve an abnormal event via a trained computational model 140 (i.e., real-world images provided to diagnosis a device problem).

In various embodiments, images 135 may be, may include, and/or may be associated with processed image information, such as OCR results, XOR results, and/or the like. In some embodiments, processed image information may include bit maps, binary images, grayscale images, and/or the like.

A user, such as an operator or technician, may send, transmit, upload, or otherwise provide images 135 to device troubleshooting system 105 via an input device 162 of computing device (e.g., a camera input device) and/or a client device 174a-n communicatively coupled to computing device 110 via network 170. For example, device troubleshooting application 150 may be or may include a website, internet interface, portal, or other network-based application that may facilitate uploading digital images 135 for storage in memory unit 130 and/or data stores 172a-n. In some embodiments, a patient client device 174a-n may operate a client application (for instance, a mobile application or "app") operative to communicate with device troubleshooting application 150 for providing images 135. In some embodiments, the troubleshooting process may be or may include an internet-based, Software-as-a-Service (SaaS), and/or cloud-based platform that may be used by a troubleshooting application 150 and/or an operator to test, validate, monitor, and/or the like one or more devices (locally (e.g., at or near the device) and/or remotely). Embodiments are not limited in this context.

In some embodiments, abnormal event resolution information (or resolution information) 138 may include information associated with solutions to a diagnosed abnormal event. Resolution information 138 may include recommended solutions, solution attempt results (including successful and unsuccessful attempts), and/or requests for further information (for instance, to further diagnose and/or resolve an abnormal event). For example, a diagnosis may indicate a fluid pump that is not working (however, this may be due to failure of the pump itself or failure of a component associated with the pump (e.g., a sensor), while the pump itself is operational). Device troubleshooting application, via a computational model 140, may generate output in the form of a troubleshooting request to test one or more sensors associated with the pump. The results of the sensor tests may be provided as further abnormal event information 134 that may facilitate a trained computational model 140 to determine that a flow sensor of the pump has failed, and provide a recommended resolution to replace the flow sensor as a first troubleshooting step (instead of replacing the entire pump). In another example, the results of replacing the flow sensor (i.e., attempting a recommended resolution to a diagnosis) may be saved as resolution information 138 (i.e., whether the recommended solution worked) that may be used to provide updated historical training data for computational model training processes according to some embodiments. In this manner, real-world diagnoses and solutions (successful or unsuccessful) may be used to diagnose and fix a device problem and to continually train computational models 140.

In some embodiments, computational models 140 may be used to analyze abnormal event information 134 (e.g., information associated with a device problem) to determine a diagnosis 136 (e.g., determining the type or nature of the device problem) and/or resolution information 138 (e.g., determining a solution to the device problem and/or steps to obtain more information to solve the device problem).

Non-limiting examples of computational models 138 may include one or more artificial intelligence (AI) models, machine learning (ML) models, deep learning (DL) models, a neural network (NN) (such as an artificial NN (ANN), a convolutional NN (CNN), a recurrent NN (RNN), and/or the like), an expert system, an inference engine, a decision tree, a random forest algorithm, a knowledge base, variations thereof, combinations thereof, and/or the like. Embodiments are not limited in this context.

In various embodiments, device troubleshooting application 150 may use different computational models 138 for different portions of the troubleshooting process. For example, an image-analysis computational model may be used to process images 135. In another example, a troubleshooting computational model may be used to abnormal event information 134 to generate a diagnosis 136 and/or resolution information 138. In some embodiments, one computational model 136 may be used for analyzing images 135 and abnormal event information 134 to determine a diagnosis 136 and/or resolution information 138. Embodiments are not limited in this context.

Device troubleshooting logic 122 may operate to perform a training process to train a computational model 140 using training data, which may include, without limitation historical or past abnormal event information 134 (including DHRs), diagnoses 136, resolution information 138, and/or any other type of information that may be used by computational models 140. Device troubleshooting logic 122 may operate to perform a troubleshooting process to determine and resolve device problems. The trained computational model 140 may be used by troubleshooting logic 122 to perform the troubleshooting process. In various embodiments, device troubleshooting logic 122 may be a program, code, extension, module, and/or the like of device troubleshooting application 150 (for instance, program code temporarily or permanently stored in processor circuitry 120 for execution of device troubleshooting application 150) for computing device 110 to perform troubleshooting processes via processor circuitry 120 and memory unit 130.

Figure 2:
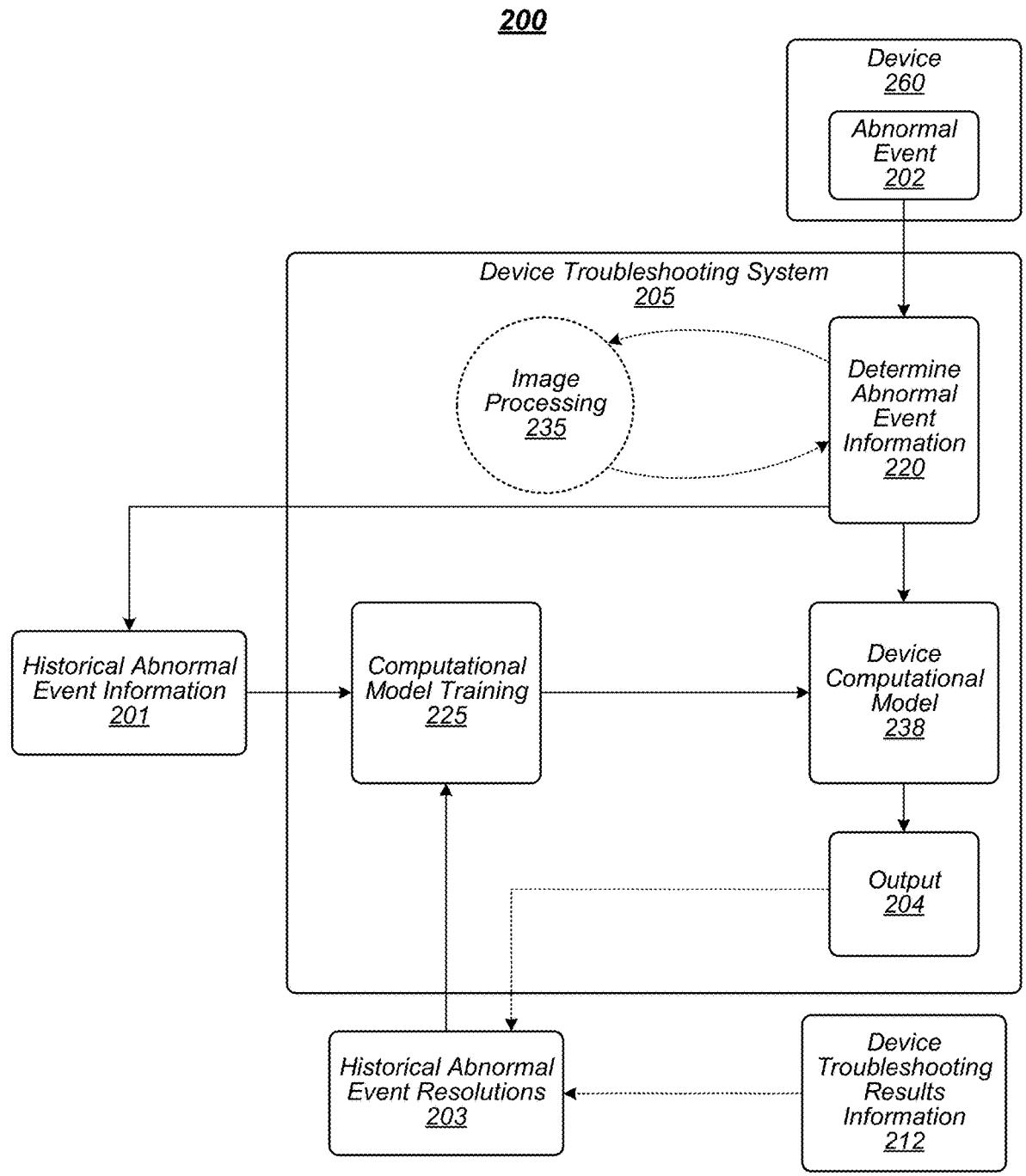
FIG. 2 illustrates a second exemplary operating environment in accordance with the present disclosure.

FIG. 2 illustrates an example of an operating environment 200 that may be representative of some embodiments. As shown in FIG. 2, operating environment 200 may include a device 260 and a device troubleshooting system 205. In some embodiments, device 260 and system 205 may be operably coupled, for instance, via one or more wired or wireless communication protocols. In various embodiments, system 205 may be operated by a technician validating, troubleshooting, operating, or otherwise interacting with device 260. Device 260 may include one or more various types of devices, machines, systems, hardware systems, software systems, components thereof, and/or the like. In some embodiments, device 260 may be a medical device, such as a dialysis system and/or a component system thereof. Embodiments are not limited in this context.

In some embodiments, system 205 may perform computational model training and/or device troubleshooting. Although only one system 205 is depicted in FIG. 2, embodiments may use multiple systems, computing devices, and/or the like for model training and/or device troubleshooting according to some embodiments. For example, a single system may perform a training process to train the computational models and may perform a troubleshooting process to diagnose and/or resolve abnormal events for device 260 In another example, one system (or set of systems) may perform the training process and another system (or set of systems) may perform the troubleshooting process (accessing the computational models trained by the other system).

As shown in FIG. 2, system 205 may receive historical abnormal event information 201, which may specifically relate to the type and/or configuration of device 260. In some embodiments, at least a portion of historical abnormal event information 201 may include HDRs for the same or similar type and/or configuration of device 260. In various embodiments, a computational model may be trained to troubleshoot different types of devices and/or configurations or operating conditions of a device. In exemplary embodiments, multiple computational models may be trained, each for different devices, device configurations, operating environments, and/or the like.

In some embodiments, the training process may train computational models to correlate abnormal event information with diagnoses (or device problems). For example, abnormal event information may include an element calibration error warning. A computational model may be trained to diagnose a device problem based on this abnormal event information, such as an element that has gone out of calibration or an operator error for failure to properly calibrate the error. The computational models may be trained to use combinations of different abnormal event information types or categories to determine a diagnosis. For example, the abnormal event information may include the element calibration error warning and a device startup checklist, for instance, indicating that the operator correctly calibrated the element. The trained computational model may therefor derive that that the element was calibrated correctly and operate to determine a reason why it went out of calibration during device operation. In this manner, the trained computational model may focus on valid diagnoses while ignoring irrelevant diagnoses.

System 205 may receive historical abnormal event resolutions, which may include information indicating resolutions for fixing device problems associated with certain abnormal event information or diagnoses. In various embodiments, the resolution information may include a diagnosis (i.e., the device problem) and past solutions that were tried, including successful and unsuccessful attempts, to resolve the device problem. In some embodiments, the resolution information may include requests, steps, processes, and/or the like to obtain further information to further diagnosis a device problem and/or to resolve the device problem.

The computational models may be trained 225 via system 205 to generate resolutions to diagnoses based on historical resolutions to device problems. In some embodiments, the computational models may be trained such that diagnoses may be associated with a confidence score or otherwise weighted to indicate a confidence or probability that the correct diagnosis was determined based on input abnormal event information. Similarly, resolutions may be associated with a confidence score or otherwise weighted to indicate a confidence or probability that a resolution may solve a device problem (or lead to further information that may solve the device problem). In this manner, an operator may be presented with one or more diagnoses and/or resolutions and associated confidence scores to provide an indicator of a direction for troubleshooting a device problem. In some embodiments, training 225 may include training to determine resolutions that comply with various guidelines, such as FDA guidelines, CFR guidelines, and/or the like.

The device computational models may be trained 225 to receive input in the form of abnormal event information (which may include a specific diagnosis) and to generate output in the form of a diagnosis (the device problem) and resolutions to address the diagnosis (which may include information requests to further diagnosis and/or provide a resolution to the device problem). Accordingly, the computational models may be trained to map abnormal event information to one or more diagnoses (or device problems) and/or resolutions.

As shown in FIG. 2, an abnormal event 202 may be associated with device 260. Abnormal event 202 may include various predetermined conditions, such as an error, alarm, warning, operating values (e.g., pressures, voltages, fluid flow rates, and/or the like), and/or the like.

System 202 may determine abnormal event information 220. In general, abnormal event information may include any information associated with an abnormal event, for instance, that may be associated with a diagnosis and/or a resolution. Non-limiting examples of abnormal event information may include, device configuration information, device element (e.g., sensors, valves, pumps, regulators, actuators, and/or the like) information, active operating method, device state information, active GUI information, images, alarms, warnings, errors, error codes, software error information, hardware error information, and/or the like. In some embodiments, images may be associated with abnormal event 202, such as images of active display screens. System 205 may perform image processing 235 (see, for example, FIGS. 4-6B) to determine all or some of the abnormal event information. In various embodiments, determined abnormal event information 220 may be added to historical abnormal event information 201, for instance, to continually update and train the computational models.

System 205 may determine that abnormal event 202 is occurring on device 260, for instance, via automatic monitoring and/or through manual input by an operator. Trained device computational model 238 may receive abnormal event information and generate output 204. In some embodiments, output 204 may be or may include a diagnosis (e.g., an indicator of the device problem). In various embodiments, output 204 may be or may include a resolution (e.g., one or more steps to resolve the device problem). A resolution may be attempted on device, for instance, automatically via system and/or manually by an operator. The results of the resolution 212 may be provided as historical abnormal event information, for instance, to continually update and train the computational models.

In some embodiments, system 205 may determine abnormal event information 220 via a computational model. For example, system 205 may obtain a set or snapshot of device information, which may include all or a portion of operating characteristics of device. The operating characteristics may include parameter settings and/or operating information, such as voltages, sensor readings, device state information (including (real-world and/or virtual) button settings, switch settings, lights, and/or the like), device connections (e.g., connections to external devices), active/historical alarms, active/historical warnings, active/historical messages, device configuration or settings, active method/prescription/workflow/etc. being performed by device, calibration state, validation state, device model information, and/or any other information associated with the operation of device.

The computational models may be trained 225 to filter the available device information provided in the device information set to the information relevant to diagnosing abnormal event 202. For example, if there is a temperature sensor calibration error, the pump and fluid flow sensors may be ignored for determining a diagnosis (unless they are related to calibrating a temperature sensor). Accordingly, the computational models may learn to filter for the most relevant information for determining a diagnosis and/or resolution.

Abnormal event 202 may be a defined or known device problem (for example, a temperature sensor failure that has occurred previously and was used for computational model training). Alternatively, abnormal event 202 may be an undefined or unknown set of abnormal event information (e.g., a new device problem or a known device problem with different operating conditions or symptoms). Accordingly, certain diagnoses may be determined via direct learning or definition, for example, provided via historical information in a data structure (for instance, a look-up table, data map structure, decision tree, and/or the like). For example, the computational models may be trained with historical data indicating that a low flow alarm and a low pump voltage alarm simultaneously (historical abnormal event information) indicates a pump failure diagnosis (output 204).

In some embodiments, there may be undefined or unknown device problems (including new or unknown combinations of abnormal event information). For example, device computational model 238 may be trained on a low flow alarm with a low pump voltage (for instance, there is a pump failure leading to the low flow alarm). However, abnormal event 202 may be a low flow alarm without a low pump voltage (for instance, the pump is operating normally and, therefore, there may be another reason for the low flow alarm), which may not be included in historical abnormal event information 201 used to train device computational model 238. Accordingly, diagnoses may be determined via indirect processes, for example, in which the computational model is trained to extrapolate a diagnosis and/or resolution based on unknown or undefined abnormal event information.

Figure 3:
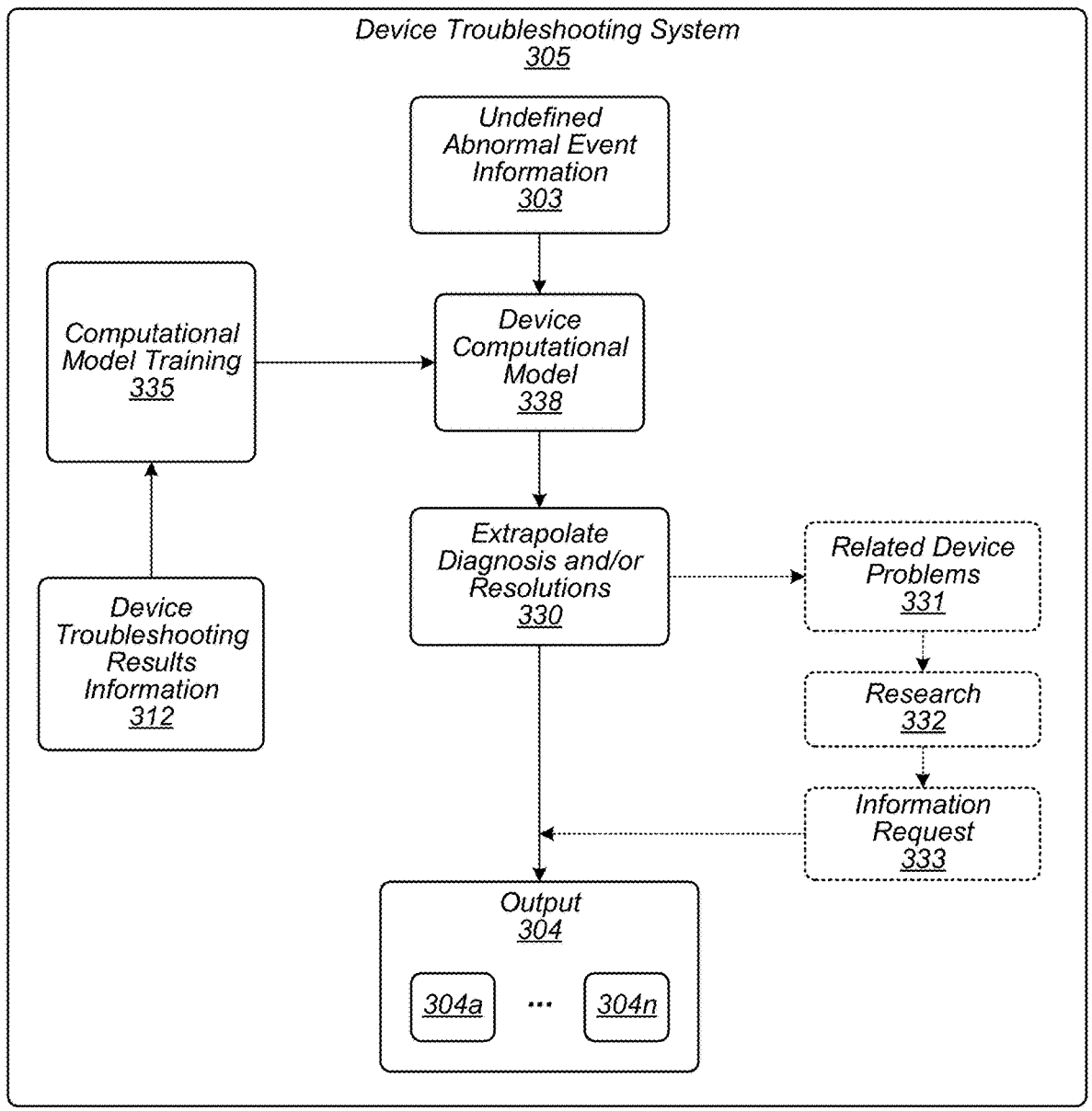
FIG. 3 illustrates a third exemplary operating environment in accordance with the present disclosure.

FIG. 3 illustrates a third exemplary operating environment in accordance with the present disclosure. As shown in FIG. 3, device troubleshooting system 305 may determine undefined abnormal event information 303. In general, undefined abnormal event information 303 may include an unknown set or combination of abnormal event information that was not used to train device computational model 338.

In various embodiments, device computational model 338 may operate to extrapolate a diagnosis and/or a resolution 330. Extrapolation may be based on various processes, including computational model processes (e.g., ML and/or AI processes for extrapolating output for undefined input). In various embodiments, extrapolations may be based on analyzing undefined abnormal event information based on related device problems (e.g., analyzing known low fluid flow device problems for an unknown low fluid flow device problem), research (e.g., accessing available information from manufacturers, digital manuals/guides, troubleshooting databases, and/or the like), and/or information requests (e.g., requesting further information and/or diagnostic steps to be performed to determine further information, either automatically or via an operator). Device computational model 338 may generate one or more outputs 304a-n, providing extrapolated diagnoses, resolutions, information requests, and/or the like. The results of the diagnosis and/or resolutions (for example, provided as outputs 304a-n) may be used for computational model training 335 to continually update device computational model 338.

In some embodiments, a device may be associated with a MES system (Manufacturing Execution System) or other system that stores data (for instance, in an XML file) associated with events, errors, data logs, and/or the like. As device computational model 338 is in learning routine for an unknown abnormal event, device computational model 338 may access MES to grab the XML file for this particular solution and store it in a secured location.

In some embodiments, abnormal events may be associated with images, including images of the actual device (e.g., showing device settings, operational status, and/or the like) and/or images of device screens (e.g., GUI objects presented on a device display screen). In various embodiments, images may be used as a source of (or to generate) abnormal event information.

Figure 4:
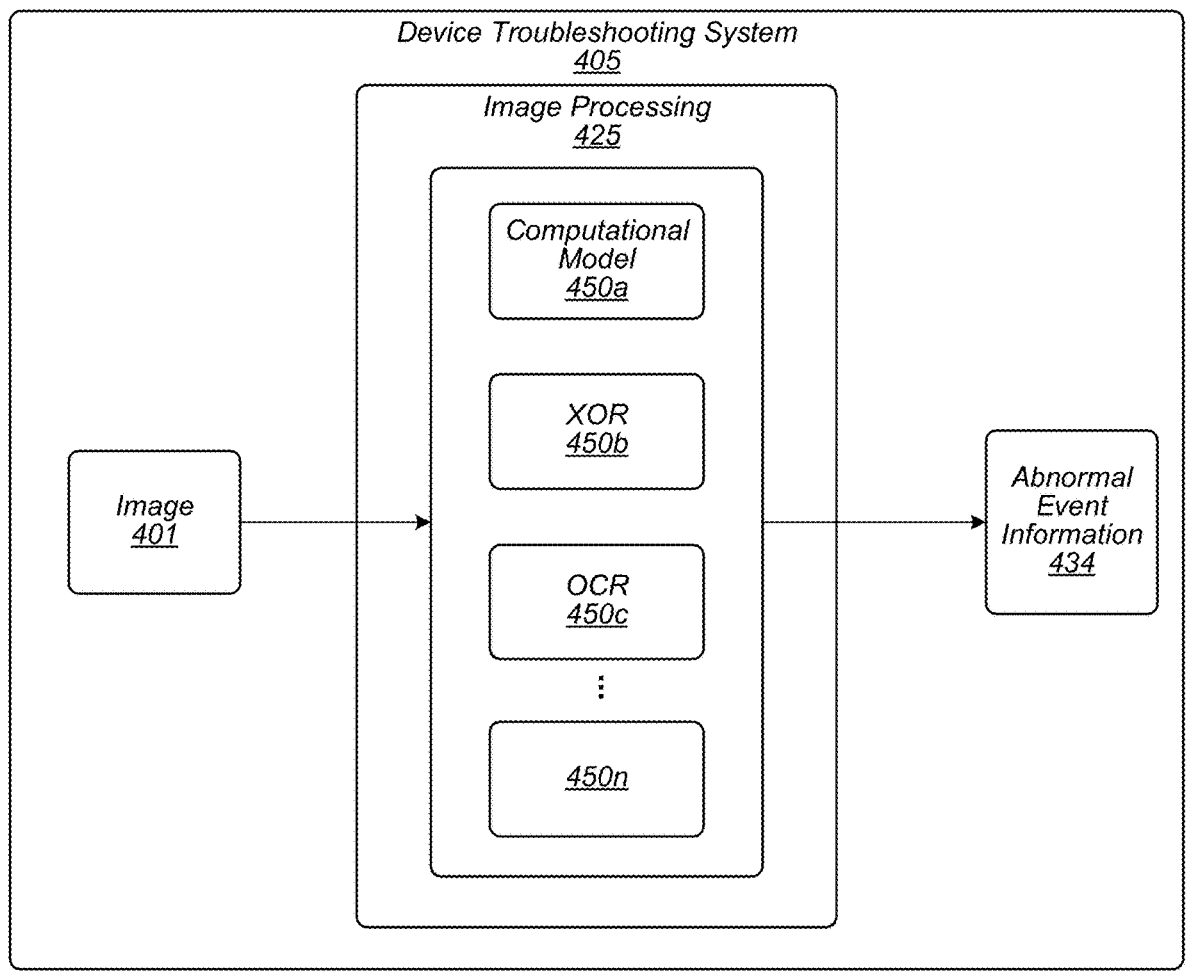
FIG. 4 illustrates a fourth exemplary operating environment in accordance with the present disclosure.

FIG. 4 illustrates a fourth exemplary operating environment in accordance with the present disclosure. As shown in FIG. 4, a device troubleshooting system 405 may be configured to perform image processing 425 (for instance, via troubleshooting logic 122 and/or troubleshooting application 150). Image processing 425 may access an image 401 to generate abnormal event information 434 (or a diagnosis or resolution) via one or more image processing techniques.

Figure 5A:
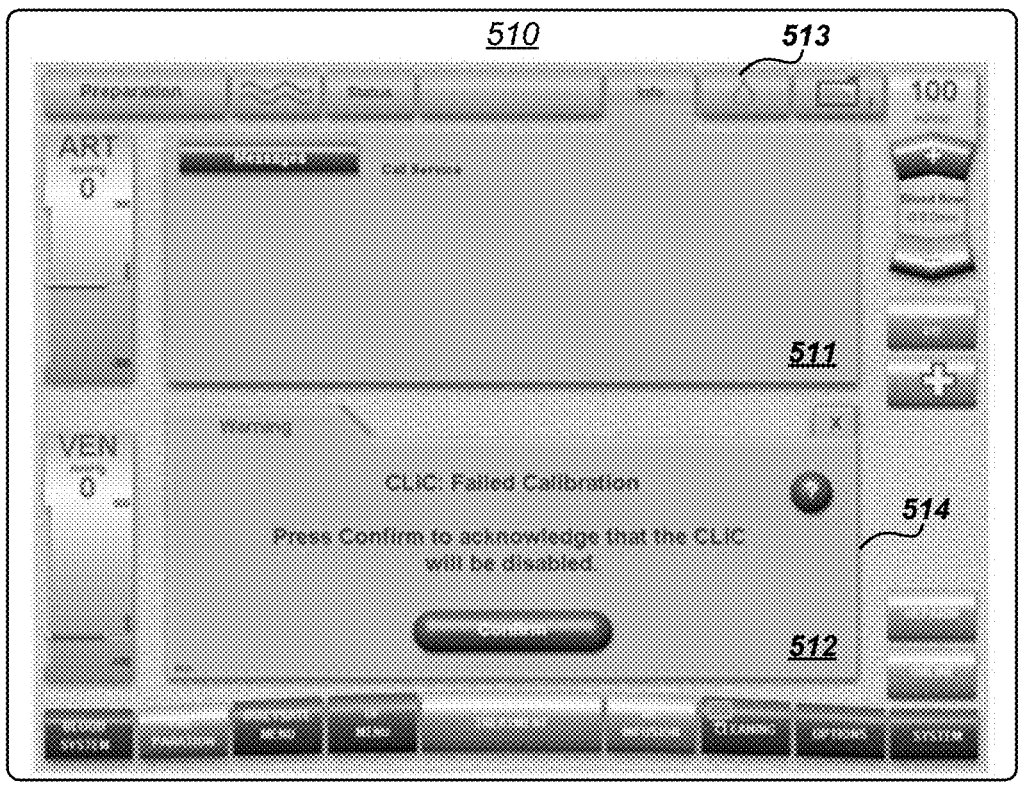
FIGS. 5A and 5B depict illustrative abnormal event information images in accordance with the present disclosure.
Figure 5B:
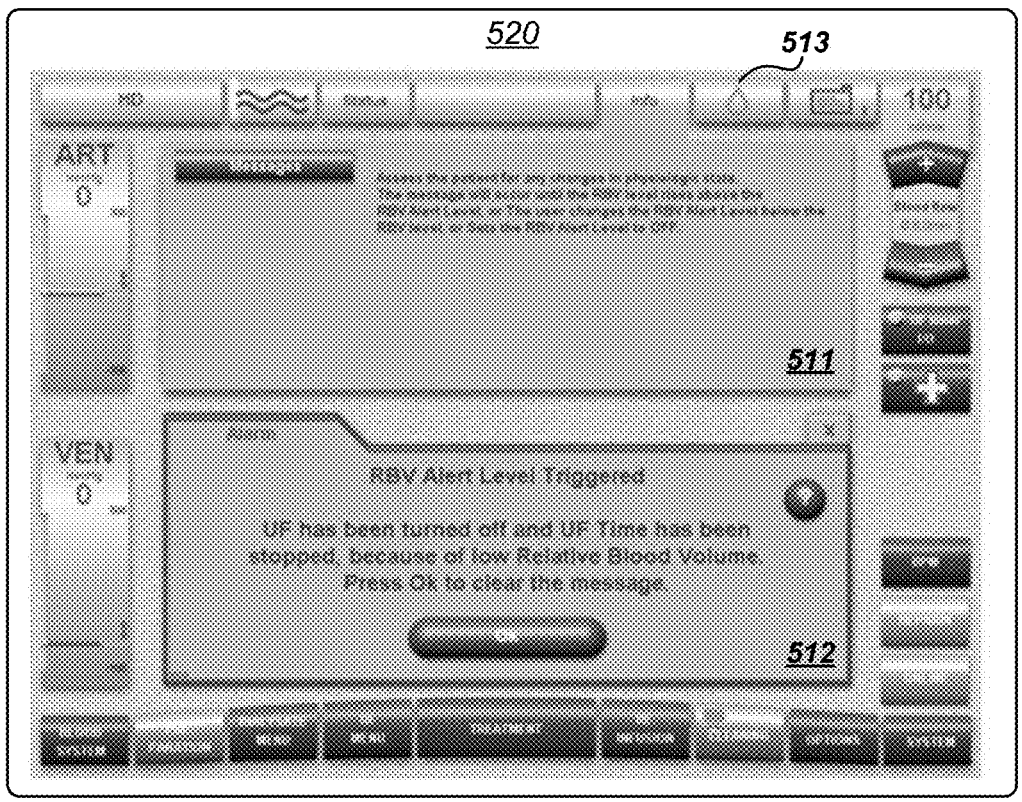

FIGS. 5A and 5B depict illustrative abnormal event information images in accordance with the present disclosure. Referring to FIGS. 5A and 5B, an image 510 or 520 may be a GUI window or screen of a device, such as a HD machine. In various embodiments, images 510 or 520 may include regions or GUI objects for textual information, such as a message 511 area and/or a warning/alarm area 512. In some embodiments, images 510 or 520 may include GUI objects associated with various elements (e.g., buttons, lights, components, and/or the like), operating parameters, device state, patient information (e.g., vitals, physiological information, and/or the like), and/or the like. For example, images 510 or 520 may include status or operating GUI objects 513 (only one of each are labeled in FIG. 5A to simplify the figure). For instance, a status GUI object 513 may show the status of device elements, such as component on/off status, settings (e.g., temperature, pressure, flow rate, and/or the like), method step (e.g., preparation, drain phase, infusion, calibration, and/or the like). As shown in FIG. 5A, image 510 includes message text ("Call service") 511 and a warning 512. Referring to FIG. 5B, image 520 includes message text 511 associated with an alarm 512.

In some embodiments, image processing 425 may include one or more image processing techniques 425a-n, including, without limitation, computational model processing 450a, XOR processing 450b, OCR 450c processing, combinations thereof, variations thereof, and/or the like. For computational model processing 450a, image 401 may be provided to a trained computational model, such as an AI/ML model, a DL model, a NN (DLNN, CNN, ANN, RNN, and/or the like), and/or the like. The computational model may be trained to generate output in the form of abnormal event information 434, a diagnosis, a resolution, and/or the like based on image 401 input.

For XOR processing 450b, an image may be subjected to XOR processing/comparison with historical images to determine an XOR image that may be used to evaluate a match. In various embodiments, image 401 may be pre-processed before XOR processing 450b. For example, image 401 may be translated into a bitmap, character string, grayscale image, and/or the like. For instance, each pixel of image 401 may be designated as a logical "1" if there is text, portion of text, or other GUI object and "0" otherwise (blank space in a message field) and stored as a map, string, vector, array, or other data structure. The image data structure may be compared to images (or image data structures) of historical images. If a pixel (or other portion) of image 401 and a historical image have text (or other GUI object) or a portion of text in the same pixel, a "0" may be returned (as XOR returns a "0" if the Boolean input is the same for both image 401 and the historical image (i.e., they both have text in the pixel or they both do not have text in the pixel), and a "1" otherwise (i.e., one has text in the pixel and the other does not have text in the pixel)). Accordingly, if the image data structures of image 401 and a historical image match (i.e., have the same text, alarm, warning, and/or the like), the resulting XOR image will be blank (or above a blank threshold); otherwise, the XOR image will not be blank (or below a blank threshold).

Figure 6A:
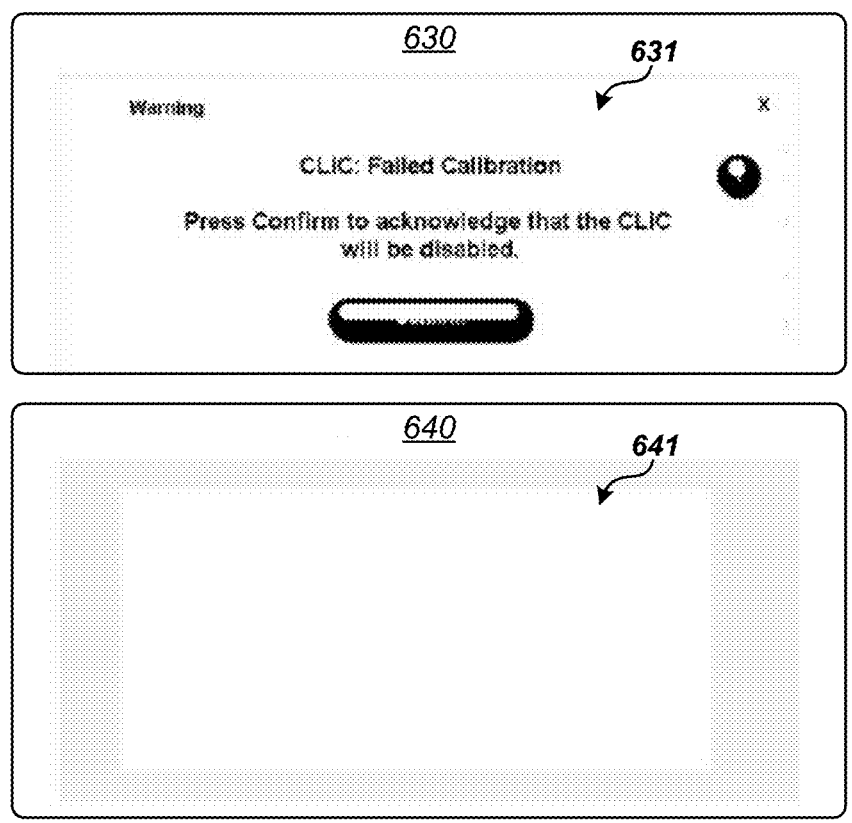
FIGS. 6A and 6B depict illustrative abnormal event image processing in accordance with the present disclosure.

FIG. 6A depicts illustrative abnormal event image processing in accordance with the present disclosure. More specifically, FIG. 6A depicts XOR processing according to some embodiments. As shown in FIG. 6A, image 630 may include a message area 631 of an image, such as area 512 of FIG. 5A. A corresponding area 641 of XOR image 640 may be blank (or above a blank threshold) because XOR image 640 was determined based on an XOR of image 630 and a historical image with the same or substantially the same text in a corresponding text area. Accordingly, the historical image of the XOR process is a match for image 630 (and, therefore image 510). In this manner, abnormal event information may be determined for image 510 because it is the same (or at least partially the same) as the abnormal event information for the historical image. The identified historical image may be used as a pointer toward the potential solution, for instance, within a computational model, an expert system, a lookup database, via a computational model, and/or the like. In some embodiments, the blank threshold may be about 80%, about 85%, about 90%, about 95%, about 96%, about 97%, about 98%, about 99%, or any value or range between any two of these values (including endpoints).

For XOR processing 450b, if there changes to an image (for instance, during development, as part of a software update, and/or the like), such as text and/or its position on the screen, the system only needs to replace the stored historical images with the new images from. An XOR process may be capable of determining a match (or lack of a match) in less than one minute.

Figure 6B:
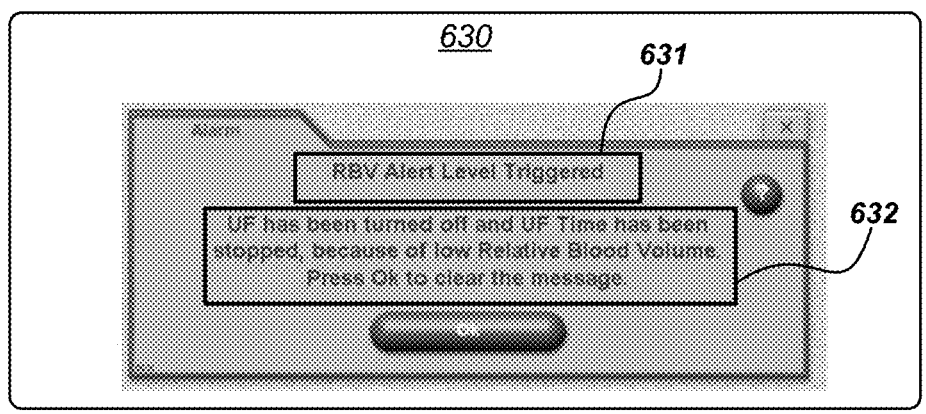

For OCR processing 450c, text may be determined on image 101, for instance, in one or more designated text areas (e.g., 511, 512) and/or via use of a bounding box 514. FIG. 6B depicts illustrative abnormal event image processing in accordance with the present disclosure. More specifically, FIG. 6B depicts an aspect of OCR processing according to some embodiments. As shown in FIG. 6B, a portion of image 520 in an alarm region 512 may be determined (cropped and/or the like) and text areas 631 (e.g., alarm name) and 632 (e.g., alarm text) identified. OCR or other character recognition techniques may be used to determine the text on image, for instance, to determine the exact text of the error/warning/etc. to generate abnormal event information 434 (or a diagnosis or resolution). The identified text may be used as a pointer toward the potential solution, for instance, within a computational model, an expert system, a lookup database, via a computational model, and/or the like.

In one embodiment, an Artificial Intelligent (AI) agent is used that is trained to learn troubleshooting processes, solutions, and/or the like for a device. For instance, the AI agent may incrementally learn the processes when presented with positive and negative events during design, development, manufacturing, real-world use, and/or the like. In some embodiments, no supervision is provided for the leaning activity of the AI agent; rather, it is exposed to the same set of events as an operator on the floor. The AI agent makes use of these events and historical information, such as Device History Records (DHR), to learn and then come up with solutions for the problems presented to it. Accordingly, in some embodiments, computational models (such as an AI agent) may operate via unsupervised learning.

In various embodiments, a device troubleshooting process may be operative to visually capturing a device problem by viewing/capturing a screen; processing the image to identify the errors/alarms/warnings on the screen; determine a diagnosis; determine a resolution; implement the solution, either automatically via a system computing device or by providing the solution to the operator to execute; and, if No solution is available, determine/learn a new solution (extrapolate) and store it in the historical information/update computational model training.

In some embodiments, for the device troubleshooting system (such as an AI agent) visual sensory capability may be provided in form of a camera and code (e.g., Python) for processing it. For example, the AI agent may be or may include a program that acquires images from a camera mounted on an AIO (All-In-One Desktop). This AIO may be part of the Troubleshooting area on the production floor. The captured image is processed to crop out the error message which satisfies the visual aspect of the AI agent, and may be analyzed further to determine abnormal event information, diagnoses, resolutions, and/or the like.

In one embodiment, for an AI agent a mapping of the stored images to the possible solutions may be generated. These solutions may be stored in one or more data structures, such as separate XML (Extensible Markup Language) files in a secured location. After identifying a matching image (XOR) or text (OCR), a next step may be to search for a resolution and provide it to the operator (or perform automatically, if possible, such as checking a sensor reading, element voltage, and/or the like). For example, the AI agent may search the XML file associated with the identified image. If a solution XML file is available with the identified image, then the AI agent may grab that file from the secured location, decipher it and present the solution to the operator. If no file is available, then the AI agent may inform the operator and provide recommended resolutions.

Figure 7:
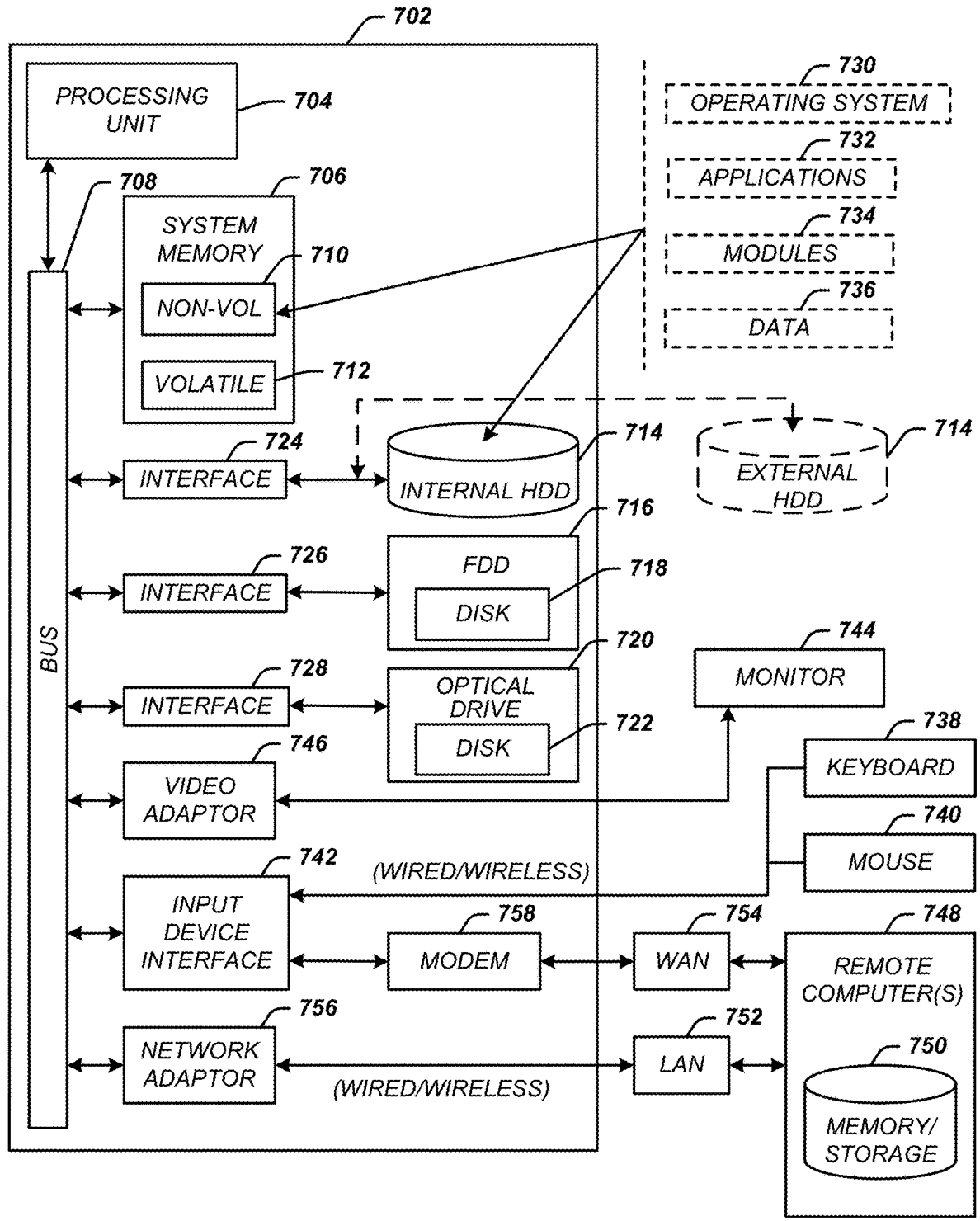
FIG. 7 illustrates an embodiment of a computing architecture in accordance with the present disclosure.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 may be a commercially available processor and may include dual microprocessors, multi-core processors, and other multi-processor architectures.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 711, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1114 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of computing device 110.

A user can enter commands and information into the computer 702 through one or more wired/wireless input devices, for example, a keyboard 738 and a pointing device, such as a mouse 740. These and other input devices are often connected to the processing unit 704 through an input device interface 742 that is coupled to the system bus 708, but can be connected by other interfaces.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wired and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

The computer 702 is operable to communicate with wired and wireless devices or entities using the IEEE 802 family of standards, such as wireless devices operatively disposed in wireless communication (e.g., IEEE 802.17 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus, comprising:
   at least one processor; and
   a memory coupled to the at least one processor, the memory comprising instructions that, when executed by the at least one processor, cause the at least one processor to:
   receive an image associated with a device experiencing an abnormal event,
   process the image via an exclusive OR (XOR) process against a plurality of historical images to generate XOR results, wherein each one of the plurality of historical images comprises an associated device problem,
   identify one of the plurality of historical images as a match to the image based on the XOR results,
   identify diagnosis of the abnormal event based on the one of the plurality of historical images and the associated device problem, and
   determine, via a computational model, at least one resolution to resolve the diagnosis of the abnormal event.

2. The apparatus of claim 1, wherein the instructions, when executed by the at least one processor, further cause the at least one processor to:
   train the computational model to determine at least one diagnosis based on historical abnormal event information and historical abnormal event resolution information.

3. The apparatus of claim 1, wherein the computational model comprises at least one of:
   a machine learning (ML) model,
   an artificial intelligence (AI) model, or
   an expert system.

4. The apparatus of claim 1, wherein the device comprises a dialysis machine.

5. The apparatus of claim 1, wherein the computational model is trained to extrapolate at least one diagnosis for undefined abnormal event information.

6. The apparatus of claim 1, wherein the instructions, when executed by the at least one processor, further cause the at least one processor to:
   identify the one of the plurality of historical images as the match to the image based on the XOR results comprising determining whether the XOR results indicate a match for a number of pixels of the image above a threshold number.

7. The apparatus of claim 6, wherein the threshold number comprises greater than or equal to 80% of the pixels.

8. The apparatus of claim 1, wherein the image is a screenshot of a graphical user interface (GUI) of the device.

9. A computer-implemented method, comprising, via at least one processor of a computing device:
   receiving an image associated with a device with an abnormal event active on the device;
   applying an exclusive OR (XOR) process to the image and a plurality of historical images to generate XOR results, wherein each one of the plurality of historical images comprises an associated device problem;
   identifying one of the plurality of historical images as a match to the image based on the XOR results;
   identifying a diagnosis of the abnormal event based on the one of the plurality of historical images and the associated device problem; and
   determining, via a computational model, at least one resolution to resolve the diagnosis of the abnormal event.

10. The method of claim 9, further comprising:
    training the computational model to determine at least one diagnosis based on historical abnormal event information and historical abnormal event resolution information.

11. The method of claim 9, wherein the computational model comprises at least one of:
    a machine learning (ML) model,
    an artificial intelligence (AI) model, or
    an expert system.

12. The method of claim 9, wherein the device comprises a dialysis machine.

13. The method of claim 9, wherein the computational model is trained to extrapolate at least one diagnosis for undefined abnormal event information.

14. The method of claim 9, wherein identifying the one of the plurality of historical images as the match to the image based on the XOR results comprises:
    determining whether the XOR results indicate a match for a number of pixels of the image above a threshold number.

15. The method of claim 14, wherein the threshold number comprises greater than or equal to 80% of the pixels.

16. The method of claim 9, wherein the image is a screenshot of a graphical user interface (GUI) of the device.

* * * * *